3,639,653
PROTECTIVE COATING FOR METAL AND
WOOD SURFACES
Trevor P. Clark, North Vancouver, British Columbia, and Paul C. Trussell, Vancouver, British Columbia, Canada, assignors to British Columbia Research Council, University of British Columbia, Vancouver, British Columbia, Canada
No Drawing. Filed Mar. 19, 1969, Ser. No. 808,649
Int. Cl. C08f 29/50, 45/04, 45/30
U.S. Cl. 260—33.8 R                 12 Claims

ABSTRACT OF THE DISCLOSURE

There is described a coating composition that can be applied to wood and metal surfaces in the air or under water. This coating includes liquid chlorinated paraffin and/or low molecular weight polystyrene, polyester resin, and a suitable hydraulic cement or gypsum.

BACKGROUND OF THE INVENTION

This invention relates to a coating composition that can be applied to wood and metal surfaces in air or under fresh or sea water.

There are a great many coating compositions in existance for both wood and metal. Some of them are suitable for application in air as long as the wood and metal are kept out of water and are not subjected to undue humid conditions. It is not practical, however, to apply the known compositions to surfaces under water, or to wet surfaces under the variety of conditions normally encountered.

One of the major problems in applying a coating to wood or metal under water is that the cohesive force within the coating usually exceeds the adhesive force between the coating and the wet metal or wood, so rather than become attached to the wood or metal substrate, the coating becomes dispersed in the surrounding water. This effect is even more pronounced in organic coatings which contain organic solvents. Another serious problem that occurs with commercially available epoxy resin under water compounds is that in temperatures of 65° F. or lower the material is not only extremely viscous to use but its setting time becomes so slow that the compound becomes soft and is dispersed by tidal action.

SUMMARY OF THE INVENTION

A coating composition according to the present invention can be used as a protective coating for metal and wood, and is unique in that it can be applied either in air or under fresh or sea water to provide a strong, flexible layer which will protect metal from corrosion and wood from attack and destruction by biological agents. The composition may be applied either by spraying or by brush to wet or dry surfaces of metal or wood in the air, and by means of a brush or a spreading instrument, such as a trowel, on metal or wood under water.

This coating adheres tenaciously to creosoted wood and provides a protection against creosote-susceptible wood borers, such as teredo species, bankia species and certain limnoria species as well as against creosote-resistant wood borers such as *Limnoria tripunctata*.

The above attributes of the present coating together with its low cost compared to other coatings, such as those containing epoxy resins, make this coating of widespread commercial value in the protection of metal structures standing in fresh or sea water, particularly in situations which are not amenable to protection by cathodic means, such as in the inter-tidal zone in sea water. Metal sheets, fastenings or pipes continuously submerged in water, periodically submerged in water such as by tidal action, or even exposed to a humid environment in air may be protected by this coating. In all such cases, the coating may be applied to the metal in its ambient condition with respect to moisture, and drying of the metal surface is not required preparatory to application of the coating. A primer coating is not required when making applications to metal or to wood.

The coating has extensive commercial applications in the protection of untreated, and particularly creosote-treated marine piling which are already in place and integral parts of extensive structures such as wharves, breakwaters, bearing piles for buildings and factories. Changes in environmental water conditions in the vicinity of such piles may cause a biological shift so as to increase the susceptibility to attack by marine wood borers. Such cases have occurred in a number of large seaports in the world as a result of pollution abatement programs which have permitted higher levels of dissolved oxygen to occur in the inshore waters incurring the spread and activity of creosote-susceptible and creosote-resistant wood borers. This composition has the distinctive advantage over others of being applicable to standing piling, whether applied to the under water portion or the above water portion.

The present coating composition comprises liquid chlorinated paraffins and/or low molecular weight polystyrene, liquid polyester resins, and hydraulic cement or gypsum. When used as a coating for wood or creosote-impregnated timber, the low molecular weight polystyrene can be used in place of or in addition to the liquid chlorinated paraffins. On the other hand, when the composition is to be used on metals, the liquid chlorinated paraffins must be included, but the polystyrenes may or may not be present.

DESCRIPTION OF THE PREFERRED EMBODIMENTS

A coating composition in accordance with the present invention comprises a mixture of about 0.7 to about 52% of a liquid adherent selected from the group consisting of liquid chlorinated paraffins with a chlorine content from about 45 to about 70% and low molecular weight polystyrenes; about 13 to about 60% of a polyester resin; and about 1.8 to about 35% of a water absorbing binder selected from the group consisting of portland cement, blast furnace cement, aluminous cement and gypsum, these percentages being of the total composition. As stated above, liquid chlorinated paraffin must be present when the composition is intended for metal surfaces, and low molecular weight polystyrene is required in compositions for creosote-treated wood surfaces. However, both of these constituents may be included when the composition is used for either purpose.

The chlorinated paraffin should be of a liquid type with a chlorine content preferably between 45 and 70%, a viscosity at 99° C. between 24 and 300 centipoises (preferably 75–195 centipoises) and a specific gravity between 1.20 and 1.58 at 25° C. If the chlorine content is below 45% solubility in the polyester resin is reduced and, in such cases, a blend must be made with paraffin of higher chlorine content to compensate for this and give adequate miscibility.

Due to the highly polar nature of the liquid chlorinated paraffin used in the composition and the strong affinity between these paraffins and the metal surface, the coating clings tenaciously to metal and can be spread easily over the surface of the metal when it is submerged in water. The affinity provided by these chlorinated paraffins prevents the coating from being removed from the metal or wood substrate by tidal action during the initial hardening process of the coating. The high density of the liquid chlorinated paraffins increases the specific gravity of the coating so that it is not dislodged by the buoyant action of the water. Due to the very low rate of moisture vapor transmission of the composition (less than epoxy resins), corrosion of metal is retarded to a high degree. The high content of chlorine in the chlorinated paraffins reduces the affinity of the coating for oxygen thereby reducing oxidation of constituents of the coating.

The polyester resin is used to act as an initial hardener for the liquid chlorinated paraffins and the low molecular weight liquid polystyrenes. The polyester resin itself, even when used with catalysts will not form a bond on metal when applied under water. When used in conjunction with chlorinated paraffins and the polystyrenes, the polyester resin produces early hardening of the coating under water so as to prevent tearing away or loss of the coating by objects drifting in the water or on the surface of the water. Preferred polyester are unsaturated polyesters such as those made from bisphenol-A and fumaric acid as set out in U.S. Pat. No. 2,634,251. This resin is a liquid and has a viscosity of 400–550 centipoises at 25° C. (Brookfield Viscosimeter) and is resistant to water, acids, alkalies and to moisture vapor absorption.

Hydraulic cements that may be used are portland cements types I, II, III, IV, V, blast furnace cement and aluminous cements. Also gypsum (hydrated calcium sulfate) may be used in place of hydraulic cement as a water absorber, but the resulting coating is softer than with hydraulic cements. The hydraulic cements absorb water trapped under the coating during application and chemically combine with the water forming a moisture barrier of hydrated cement filler which subsequently impedes further migration of water through the coating. This removal of water provides a dry surface in the case of metal, and eliminates free surface moisture in the case of wood. The removal of such water not only reduces the possibility of corrosion but also provides a surface to which the adhesive components of the composition can bond.

The purpose of the low molecular weight polystyrenes is to promote adhesion to creosoted wood which normally resists attachment of most other materials. One of the preferred liquid polystyrenes is one under the trade name Piccolastic A–5. Piccolastic A–5 has a molecular weight of about 300, specific gravity of 1.02 and a melting point (° C., Ball and Ring) of 5°. This resin blends well with the polyester resin and in itself is a good solvent for the chlorinated paraffin, thereby increasing the solubility of the chlorinated paraffins in the polyester resin. It also acts as a plasticizer in the polyester resin giving good low temperature flexibility. These properties can also be useful in the coating for steel to provide a decrease in viscosity for cold weather application and to assist in the manufacture of the compound by providing greater ease of solution of the chlorinated paraffins in the polyester resin. To reduce its viscosity for ease of handling and mixing, this polystyrene may be warmed.

In addition to the three or four basic constituents of the coating a number of other substances or materials may be added to give improvements in specific properties of the coating. These are described below.

Cobalt naphthenate can be used to accelerate the catalytic effect of methyl ethyl ketone peroxide or benzoyl peroxide which can be used to cause the polyester resin to cure. If desired, when benzoyl peroxide is used, dimethyl amine in the amount of 0.1 to 0.4% of the amount of polyester resin, may be included as an activator. This is not essential, but it speeds up the setting of the composition. The hydraulic cement in the presence of the methyl ethyl ketone peroxide and water, without the presence of cobalt naphthenate, will cause hardening of the protective coating, but the process is more gradual.

Inorganic fillers which may be incorporated into the coating are glass powder or fibers, quartz powder, crushed igneous rocks, calcium carbonate, barium carbonate, zinc carbonate, zinc oxide, barium sulfate, calcium silicate, aluminum silicate, asbestos or other water insoluble fillers of mineral type.

Corrosion inhibitors may be included in the coating to give protection to metal. These may be amines, such as diphenylamine added in the amount of 1% or less; zinc powder of −100 mesh; aluminum powder of −100 mesh; zinc chromate or red lead, added in amounts of 33% or less. The red lead ($Pb_3O_4$) is particularly effective both as a corrosion inhibitor and as an agent to promote uniform flow of the coating during application and to eliminate pin holes in the coating. It also accelerates the hardening of the coating. Three coating compositions are described below together with their properties that identify them for particular applications.

The following coating A is preferred for application under cold weather conditions to metal under water or in air.

Coating A

| | Percent |
|---|---|
| Chlorinated paraffin (Paroil 170–HV) | 11 |
| Polyester resin (Atlac No. 382–05) | 34 |
| Polystyrene (Piccolastic A–5) | 17 |
| Cobalt naphthenate | 0.4 |
| Calcium silicate [1] (Cab-o-Lite P–1) | 12 |
| Glass fibers,[1] 1/32-inch mesh | 13 |
| Aluminous cement | 12 |
| Methyl ethyl ketone peroxide | 0.6 |
| | 100.0 |

[1] Replaceable by other inorganic fillers such as clays, glass dust, sand, asbestos, etc.

When the first four components have been blended to uniform consistency, the calcium silicate, glass fibers and aluminous cement are added and stirred until well mixed. The methyl ethyl ketone peroxide is added just prior to application of the coating to the metal surface.

Coating B described below is preferred for application to wood or cresoted wood under water.

The first three components are mixed until uniform and then the last four components are added and well mixed. This mixture has a pot life of about 16 hours.

Coating B

| | Percent |
|---|---|
| Polyester resin (Atlac 382–05) | 34 |
| Polystyrene (Piccolastic A–5) | 16 |
| Methyl ethyl ketone peroxide | 0.4 |
| Calcium silicate [1] (Cab-o-Lite P–4) | 10 |
| Glass fibers,[1] 1/32-inch mesh | 10 |
| Portland cement | 9.6 |
| Red lead | 20 |
| | 100.0 |

[1] Replaceable by other aforementioned inorganic fillers.

Coating C, below, is ideal for protection of metal in sea water against corrosion. It is preferred to be used under warmer climatic conditions than Coating A.

Coating C

| | Percent |
|---|---|
| Chlorinated paraffin (Paroil 170–HV) | 28 |
| Polyester resin (Atlac 382–05) | 28 |
| Aluminous cement (Lightning brand) | 13 |
| Glass fibers,[1] 1/32-inch mesh | 7 |
| Calcium silicate [1] (Cab-o-Lite P–1) | 6.7 |
| Red lead | 17 |
| Methyl ethyl ketone peroxide | 0.3 |
| | 100.0 |

[1] Replaceable by other aforementioned inorganic fillers.

The first two components should be added to the next four after they have been well stirred and blended. Just prior to use, the last componnet should be added and well mixed before application of the coating.

The concentration of components for ideal coatings for metal and for wood and the limits of component concentrations are shown in the table below.

CONCENTRATION OF COMPONENTS FOR IDEAL COATINGS FOR METAL AND WOOD AND LIMITS OF COMPONENT CONCENTRATIONS

| | Ideal for— | | Min. and max. for wood or metal, percent |
|---|---|---|---|
| | Wood, percent | Metal, percent | |
| Chlorinated paraffin | 11.0 | 32.0 | 0.7–52 |
| Polyester resin | 35.0 | 32.0 | 13–60 |
| Polystyrene | 17.5 | 0.0 | 0–52 |
| Cobalt napthenate | 0–0.4 | 0–0.3 | 0–3 |
| Methyl ethyl ketone peroxide (or benzoyl peroxide) | 0.5 | 0.3 | 0–3 |
| Hydraulic cement | 6.7 | 10.5 | 1.8–35 |
| Glass powder or fibers [1] | 7.0 | 5.3 | 0–33 |
| Calcium silicate [1] | 7.0 | 5.3 | 0–33 |
| Red lead ($Pb_3O_4$) [2] | 14.0 | 14.0 | 0–33 |

[1] Other aforementioned inorganic fillers may be substituted.
[2] Other corrosion inhibitors may be substituted, e.g., zinc dust.

Summing up, the main components of this composition serve the following purposes:

(1) Polyester resin—hardens the coating and prevents premature removal by tidal action.

(2) Chlorinated paraffin—provides strong affinity to metal and wood surfaces, is highly water repellent and has very low moisture vapor transmission. Its very high chlorine content provides material with no affinity for oxygen, thus gives protection from degeneration due to oxidation.

(3) Hydraulic cements and gypsum—these absorb moisture between the coating and substrate and cause adhesion to wet surfaces, and during the life of the coating act as a moisture trap, preventing migration of water through the coating.

(4) The low molecular weight polystyrene is essential only if the coating is to be applied to creosoted wood as it provides adhesion to such material.

The coating will work without the cobalt naphthenate, methyl ethyl ketone peroxide, or benzoyl peroxide, but sets very slowly. If fast cures are desired, both cobalt naphthenate and peroxide are added, and if intermediate rate of cure (for most uses) is required only the peroxides are used.

The fillers could be left out but do provide either a stronger or quicker setting coating if active fillers like zinc or red lead are used.

What is claimed is:

1. A non-aqueous coating composition for wood and metal surfaces in air or under water, comprising a mixture of about 0.7 to about 52% of a liquid adherent selected from the group consisting of liquid chlorinated paraffins, with a chlorine content for about 45 to about 70%, and liquid-type low molecular weight polystyrenes which adhere to creosoted surfaces; about 13 to about 60% of a liquid unsaturated polyester resin capable of acting as a quick initial hardener for said paraffins and said polystyrenes; about 1.8 to about 35% of a water absorbing binder selected from the group consisting of Portland cement, blast furnace cement, aluminous cement, and gypsum, said percentages being of the total composition.

2. A non-aqueous coating composition as claimed in claim 1 including up to about 3% of a curing agent for the polyester resin selected from the group consisting of methyl ethyl ketone peroxide and benzoyl peroxide.

3. A non-aqueous coating composition as claimed in claim 2 including up to about 3% of cobalt naphthenate to accelerate said curing agent.

4. A non-aqueous coating composition as claimed in claim 2 including, when benzoyl peroxide is used as the curing agent, dimethyl amine in an amount of about 0.1 to about 0.4% of the quantity of polyester resin in the composition.

5. A non-aqueous coating composition as claimed in claim 1 including up to about 30% of water insoluble, inorganic filler selected from the group consisting of glass powder, glass fibre, quartz powder, crushed igneous rocks, calcium carbonate, barium carbonate, zinc carbonate, zinc oxide, barium sulfate, calcium silicate, aluminum silicate and asbestos.

6. A non-aqueous coating composition as claimed in claim 1 including up to about 33% of a corrosion inhibitor selected from the group consisting of an amine inhibitor, zinc powder (—100 mesh), aluminum powder (—100 mesh), zinc chromate, and red lead ($Pb_3O_4$).

7. A non-aqueous coating composition for wood and metal surfaces in air or under water, comprising a mixture of about 0.7 to about 52% liquid chlorinated paraffin with a chlorine content of about 45 to about 70%, 0 to about 52% liquid-type low molecular weight polystyrene which adheres to creosoted surfaces, about 13 to about 60% of a liquid unsaturated polyester resin capable of acting as a quick initial hardener for said paraffins and said polystyrenes, and about 1.8 to about 35% of a water absorbing binder selected from the group consisting of Portland cement, blast furnace cement, aluminous cement, and gypsum, said percentages being of the total composition.

8. A non-aqueous coating composition as claimed in claim 7 including up to about 3% of a curing agent for the polyester resin selected from the group consisting of methyl ethyl keytone peroxide and benzoyl peroxide.

9. A non-aqueous coating composition as claimed in claim 8 including up to about 3% of cobalt naphthenate to accelerate said curing agent.

10. A non-aqueous coating composition as claimed in claim 8 including, when benzoyl peroxide is used as the curing agent, dimethyl amine in an amount of about 0.1 to about 0.4% of the quantity of polyester resin in the composition.

11. A non-aqueous coating composition as claimed in claim 7 including up to about 30% of water insoluble, inorganic filler selected from the group consisting of glass powder, glass fibre, quartz powder, crushed igneous rocks, calcium carbonate, barium carbonate, zinc carbonate, zinc oxide, barium sulfate, calcium silicate, aluminum silicate and asbestos.

12. A non-aqueous coating compositon as claimed in claim 7 including up to about 33% of a corrosion inhibitor selected from the group consisting of an amine inhibitor, zinc powder (—100 mesh), aluminum powder (—100 mesh), zinc chromate, and red lead ($Pb_3O_4$).

References Cited

UNITED STATES PATENTS

| 3,240,736 | 3/1966 | Beckwith | 260—29.6 S |
| 3,392,130 | 7/1968 | Rucker et al. | 260—33.8 |

OTHER REFERENCES

Modern Plastics Encyclopedia, McGraw-Hill, Inc., New York, N.Y. 10036 (1968), pages 476–7.

ALLEN LIEBERMAN, Primary Examiner

T. DeBENEDICTIS, Sr., Assistant Examiner

U.S. Cl. X.R.

260—33.8 UA, 41 R, 41 A, 41 B, 862